United States Patent
Sasaki et al.

(10) Patent No.: US 7,299,787 B2
(45) Date of Patent: Nov. 27, 2007

(54) INTERNAL COMBUSTION ENGINE INTAKE DEVICE

(75) Inventors: Junya Sasaki, Yokohama (JP); Hitoshi Jinno, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/488,019

(22) Filed: Jul. 18, 2006

(65) Prior Publication Data
US 2007/0017490 A1    Jan. 25, 2007

(30) Foreign Application Priority Data
Jul. 21, 2005    (JP)    ............................. 2005-210964

(51) Int. Cl.
| F02M 35/116 | (2006.01) |
| F02M 25/06 | (2006.01) |
| F02M 25/07 | (2006.01) |
| F02M 25/08 | (2006.01) |
| F02D 9/10 | (2006.01) |

(52) U.S. Cl. ............ 123/337; 123/184.35; 123/184.43; 123/184.48; 123/519; 123/568.17; 123/572

(58) Field of Classification Search ................ 123/337, 123/184.34, 184.35, 184.42, 184.43, 184.47, 123/184.48, 519, 520, 568.17, 572
See application file for complete search history.

(56) References Cited

U.S. PATENT DOCUMENTS

| 1,671,898 | A | * | 5/1928 | Gingerich | .............. | 123/184.42 |
| 6,805,087 | B2 | * | 10/2004 | Yakabe et al. | ......... | 123/184.25 |

FOREIGN PATENT DOCUMENTS

| JP | 62-70653 | * | 4/1987 | ............ | 123/184.35 |
| JP | S62-91621 | | 4/1987 | | |

* cited by examiner

*Primary Examiner*—T. M Argenbright
(74) *Attorney, Agent, or Firm*—Global IP Counselors, LLP (57) ABSTRACT

An internal combustion engine intake device is configured to improve the uniformity with which purge gas or other introduced gas is distributed to the cylinders of an engine. The intake device basically has a throttle chamber, an intake air collector, an air induction pipe, a partitioning part and a gas introducing pipe. The air induction pipe is provided between the throttle valve and the intake air collector. The partitioning part divides the space inside the air induction pipe into first and second air induction spaces. The gas introducing pipe is configured and arranged to introduce purge gas into the space inside the air induction pipe at a position between the throttle valve and the partitioning part. In one embodiment, the partitioning part is configured such that an upstream portion thereof is slanted with respect to a rotary shaft of the throttle valve.

18 Claims, 6 Drawing Sheets

INTERNAL COMBUSTION ENGINE INTAKE DEVICE

CROSS-REFERENCE TO RELATED APPLICATIONS

This application claims priority under 35 U.S.C. § 119 to Japanese Patent Application No. 2005-210964. The entire disclosure of Japanese Patent Application No. 2005-210964 is hereby incorporated herein by reference.

BACKGROUND OF THE INVENTION

1. Field of the Invention

The present invention relates to an intake device for an internal combustion engine.

2. Background Information

In the past, there have been several proposals (e.g., Japanese Laid-Open Patent Publication No. 62-91621 (pages 1 to 4, FIGS. 1 to 3)) for an intake device having a throttle valve, an intake air collector, and an air induction pipe arranged between the throttle valve and the intake air collector. In this publication, the proposed intake device has the air induction pipe is divided by a partitioning plate into a first air induction space and a second air induction space so as to employ resonance with respect to the air intake.

In view of the above, it will be apparent to those skilled in the art from this disclosure that there exists a need for an improved internal combustion engine intake device. This invention addresses this need in the art as well as other needs, which will become apparent to those skilled in the art from this disclosure.

SUMMARY OF THE INVENTION

One object of the present invention is to provide an intake device that can improve the uniformity with which purge gas or other introduced gas is distributed to the cylinders of an engine.

In order to achieve the above mentioned object and other objects of the present invention, an internal combustion engine intake device is provided that basically comprises a regulating chamber, an intake air collector, an air induction pipe and a gas introducing pipe. The regulating chamber has a regulating valve that is configured and arranged to rotate about a rotational axis to regulate a quantity of fresh air flowing therethrough. The intake air collector fluidly communicates with the regulating chamber at a position downstream of the regulating valve. The air induction pipe is arranged between the regulating valve and the intake air collector to fluidly communicate the regulating chamber with the intake air collector. The air induction pipe includes a partitioning part that is arranged and configured to divide a space inside the air induction pipe into a first air induction space and a second air induction space. The partitioning part has an upstream end portion that is slanted with respect the rotational axis of the regulating valve. The gas introducing pipe is configured and arranged to introduce a first gas into a space inside the air induction pipe at a position disposed between the regulating valve and the partitioning part.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overview of Structure of Internal Combustion Engine

Figure 1:
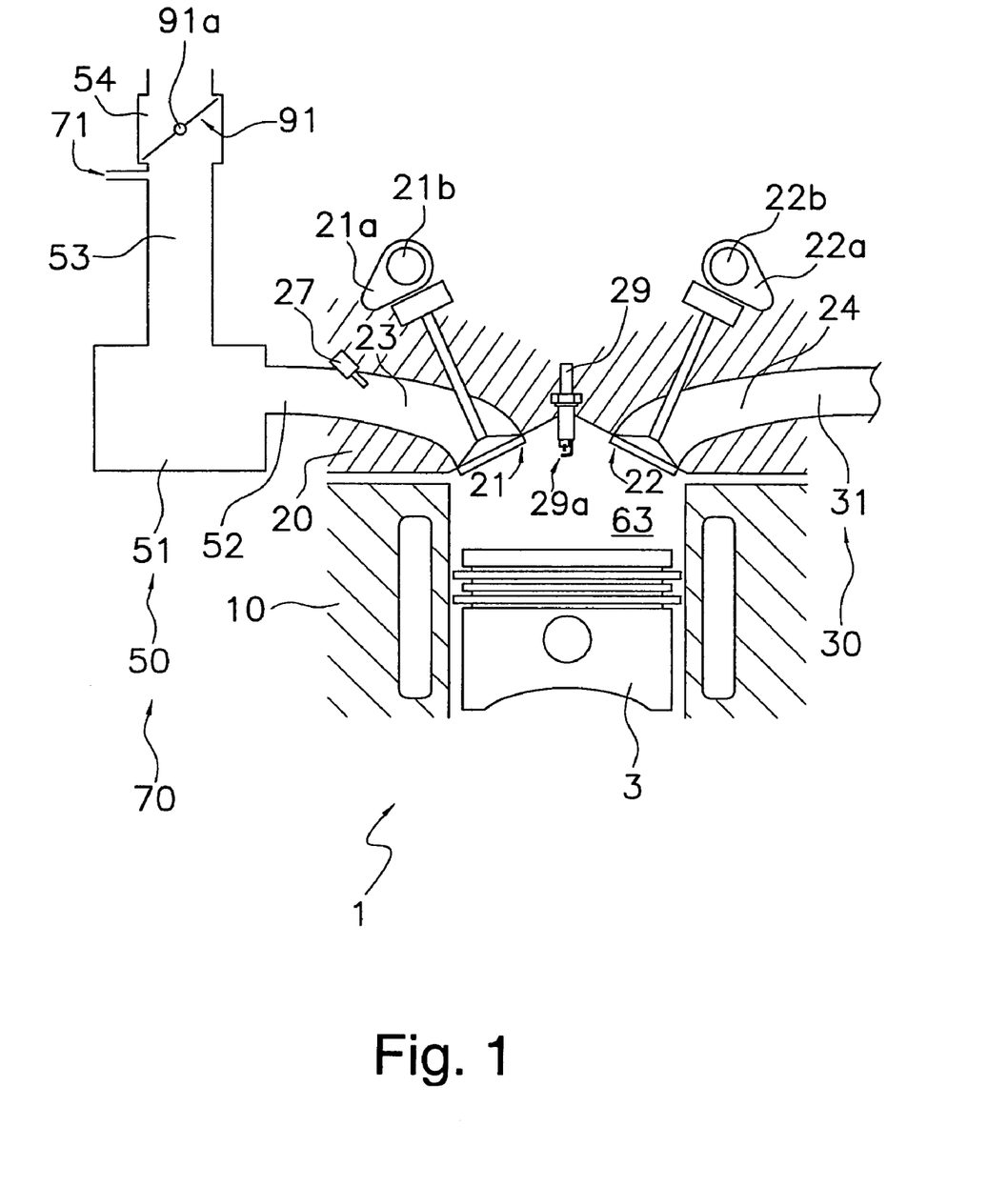
FIG. 1 is a schematic view of an internal combustion engine intake device in accordance with one embodiment of the present invention.

Referring initially to FIG. 1, an internal combustion engine 1 is schematically illustrated in accordance with a first embodiment of the present invention. The internal combustion engine 1 is, for example, a conventional V6 engine configured to execute air intake that utilizes resonance. The engine 1 is preferably mounted transversely inside an engine compartment at the front of a vehicle (i.e., a crankshaft (not shown) of the engine 1 is oriented to extend in a transverse direction of the vehicle). In the conventional V6 engine, the six cylinders are divided into a right-hand bank located on the right-hand side and a left-hand bank located on the left-hand side when the engine 1 is viewed from the lengthwise direction. Each cylinder bank has the same number of cylinders.

The engine 1 includes six combustion chambers 63 (only one combustion chamber 63 is shown in FIG. 1), an intake device 70, an exhaust device 30, six fuel injection valves 27 (only one fuel injection valve 27 is shown in FIG. 1), and six spark plugs 29 (only one spark plug 29 is shown in FIG. 1).

The combustion chamber 63 of each cylinder is defined by a cylinder head 20, a cylinder block 10, and a piston 3 as shown in FIG. 1. The cylinder head 20 has a plurality of intake ports 23 (only one intake port 23 is shown in FIG. 1) for supplying fresh air to the combustion chambers 63 and a plurality of exhaust ports 24 (only one exhaust port 24 is shown in FIG. 1) for discharging burned gas from the combustion chambers 63 as exhaust gas.

The intake device 70 is configured and arranged to guide fresh air and fuel to each of the combustion chambers 63 through an intake passage 50. A common intake device 70 serves all six of the cylinders. The intake device 70 includes a plurality of intake valves 21 (only one intake valve 21 is shown in FIG. 1), the intake ports 23, and a plurality of runners or intake branches 52 (only one intake branch 52 is shown in FIG. 1). The intake branches 52 are positioned upstream of the intake ports 23. The intake valves 21 are arranged at the downstream ends of the intake ports 23.

The exhaust device 30 is configured and arranged to discharge exhaust gas from the combustion chambers 63. The exhaust device 30 is connected to all six cylinders. The exhaust device 30 includes a plurality of exhaust valves 22 (only one exhaust valve 22 is shown in FIG. 1), the exhaust ports 24, and a plurality of exhaust branches 31 (only one exhaust branch 31 is shown in FIG. 1). The exhaust branches 31 are positioned downstream of the exhaust ports 24. The exhaust valves 22 are arranged at the upstream ends of the exhaust ports 24.

An intake camshaft 21b has a plurality of intake cams 21a (only one intake cam 21a is shown in FIG. 1) fixed thereto. The intake cams 21a are arranged such that the intake cams 21a are positioned above the intake valves 21. The intake camshaft 21b is arranged such that it rotates when the crankshaft of the engine 1 rotates. When the intake camshaft 21b rotates, the intake cams 21a cause the intake valves 21 to open and close. Likewise, an exhaust camshaft 22b having a plurality of exhaust cams 22a (only one exhaust cam 22a is shown in FIG. 1) fixed thereto is arranged such that the exhaust cams 22a are positioned above the exhaust valves 22. The exhaust camshaft 22b is arranged such that it rotates when the crankshaft of the engine 1 rotates. When the exhaust camshaft 22b rotates, the exhaust cams 22a cause the exhaust valves 22 to open and close.

One fuel injection valve 27 is provided with respect to each cylinder and each fuel injection valve 27 serves to inject fuel (gasoline) into the respective intake port 23. The tip end of the fuel injection valve 27 protrudes into the combustion chamber 63.

One spark plug 29 is provided with respect to each cylinder. Each spark plug 29 is arranged to extend into the respective one of the combustion chambers 63 from a portion of the cylinder head 20 that is positioned above the approximate center of the combustion chamber 63. The tip end portion 29a of the spark plug 29 protrudes into the combustion chamber 63.

Overview of Operation of Internal Combustion Engine

In the internal combustion engine 1, a first air mixture (described later) introduced into the intake branches 52 is guided to the intake ports 23. Pressurized fuel supplied to the fuel injection valves 27 is injected into the fresh air guided into the intake ports 23. As a result, a mixture of fresh air and fuel is formed in the intake ports 23.

In the intake stroke of any given cylinder, the intake valve 21 is opened by the intake cam 21a and the mixture of fresh air and fuel formed in the intake port 23 is introduced into the combustion chamber 63 from the intake port 23.

During the compression stroke, the piston 3 rises and the air-fuel mixture of fresh air and fuel inside the combustion chamber 63 is compressed. Then, at a prescribed timing, the tip end portion 29a of the spark plug 29 ignites the mixture of fresh air and fuel (air-fuel mixture) inside the combustion chamber 63, thereby causing the air-fuel mixture to combust.

During the power stroke, the combustion pressure generated by the combustion of the mixture of fresh air and fuel pushes the piston 3 downward.

During the exhaust stroke, the exhaust cam 22a opens the exhaust valve 22 and burned gas remaining after combustion in the combustion chamber 63 is discharged as exhaust gas to the exhaust branch 31 through the exhaust port 24.

Accordingly, the engine 1 is configured to have the mixture of fresh air and fuel inducted into combustion chambers 63 from the intake device 70. The mixture of fresh air and fuel is combusted inside the combustion chambers 63 and the combustion causes pistons 3 to move reciprocally inside cylinders. The reciprocal motion of the pistons 3 is converted into rotational motion of a crankshaft of the engine 1 by means of connecting rods (not shown).

Overview of Structure of Internal Combustion Engine Intake Device

Figure 2:
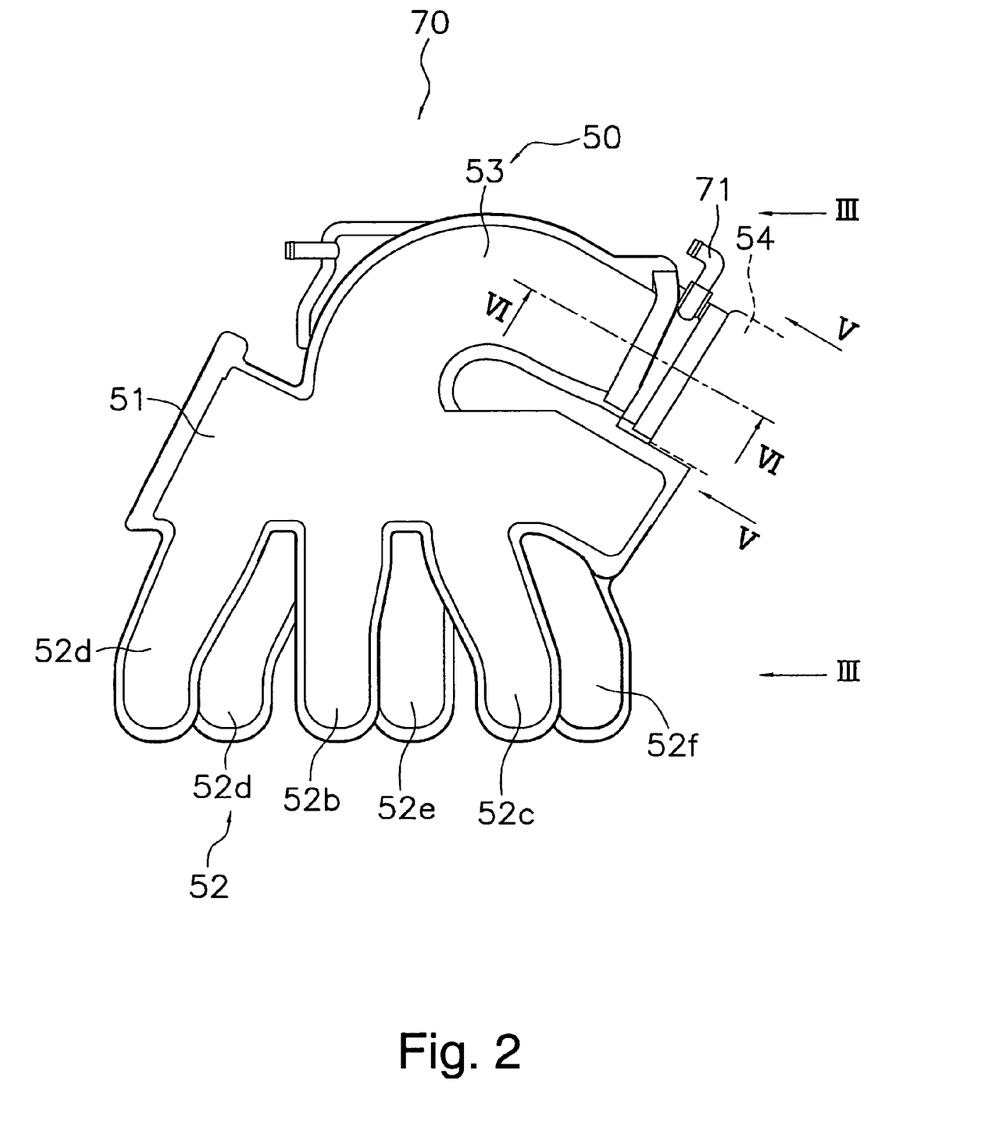
FIG. 2 is a top plan view of the internal combustion engine intake device illustrated in FIG. 1 in accordance with the present invention.
Figure 3:
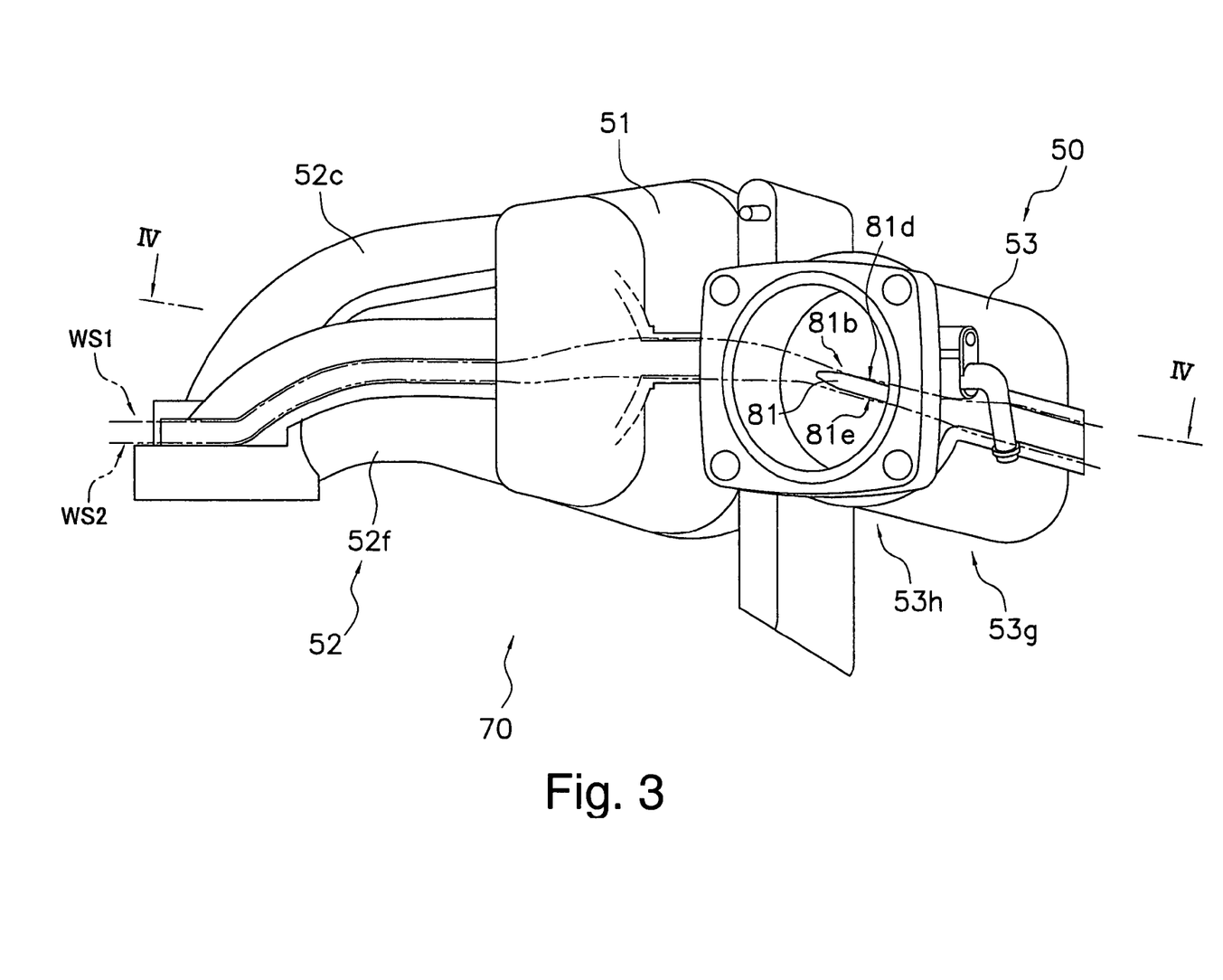
FIG. 3 is a side elevational view of the internal combustion engine intake device taken from the direction of arrows III of FIG. 2 in accordance with the present invention.
Figure 4:
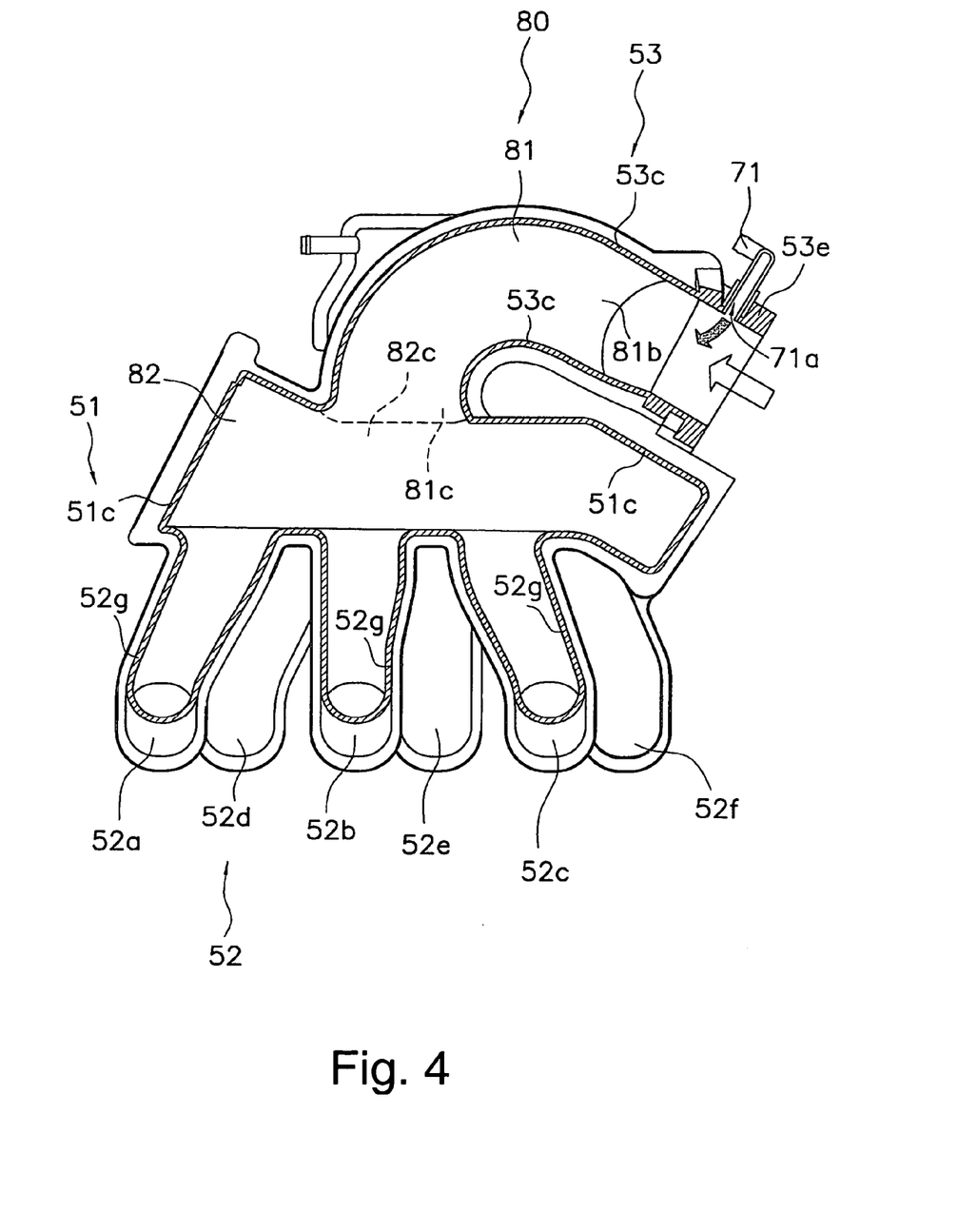
FIG. 4 is a cross sectional view of the internal combustion engine intake device in accordance with the present invention as seen along a section line IV-IV of FIG. 3.

A top plan view of the intake device 70 is shown in FIG. 2. FIG. 3 is a side elevational view of the intake device 70 from the direction of the arrows III of FIG. 2. FIG. 4 is a cross sectional view of the intake device 70 taken along a section line IV-IV of FIG. 3.

Figure 5:
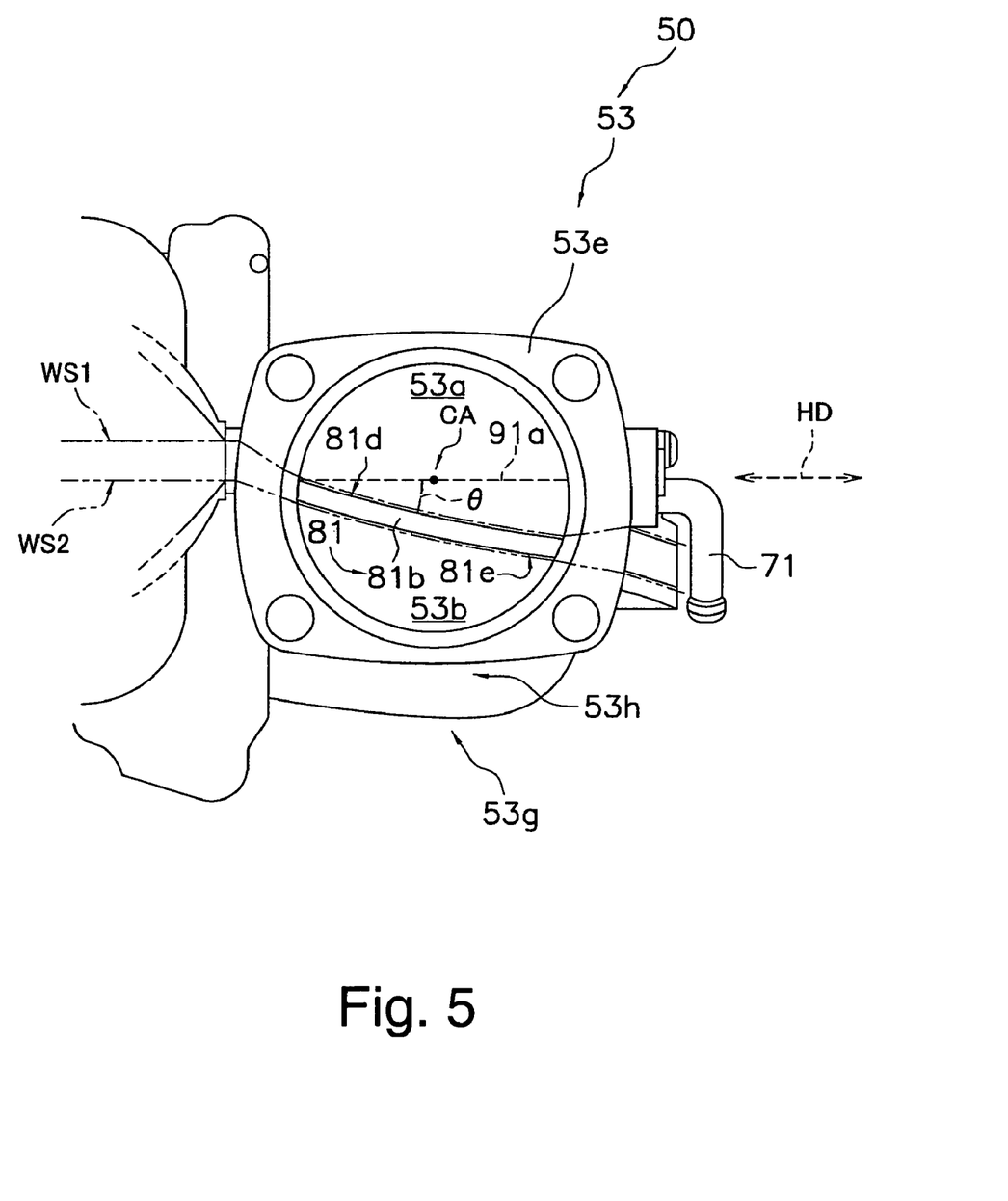
FIG. 5 is a partial end view of the internal combustion engine intake device in accordance with the present invention as seen along arrows V of FIG. 2.
Figure 6:
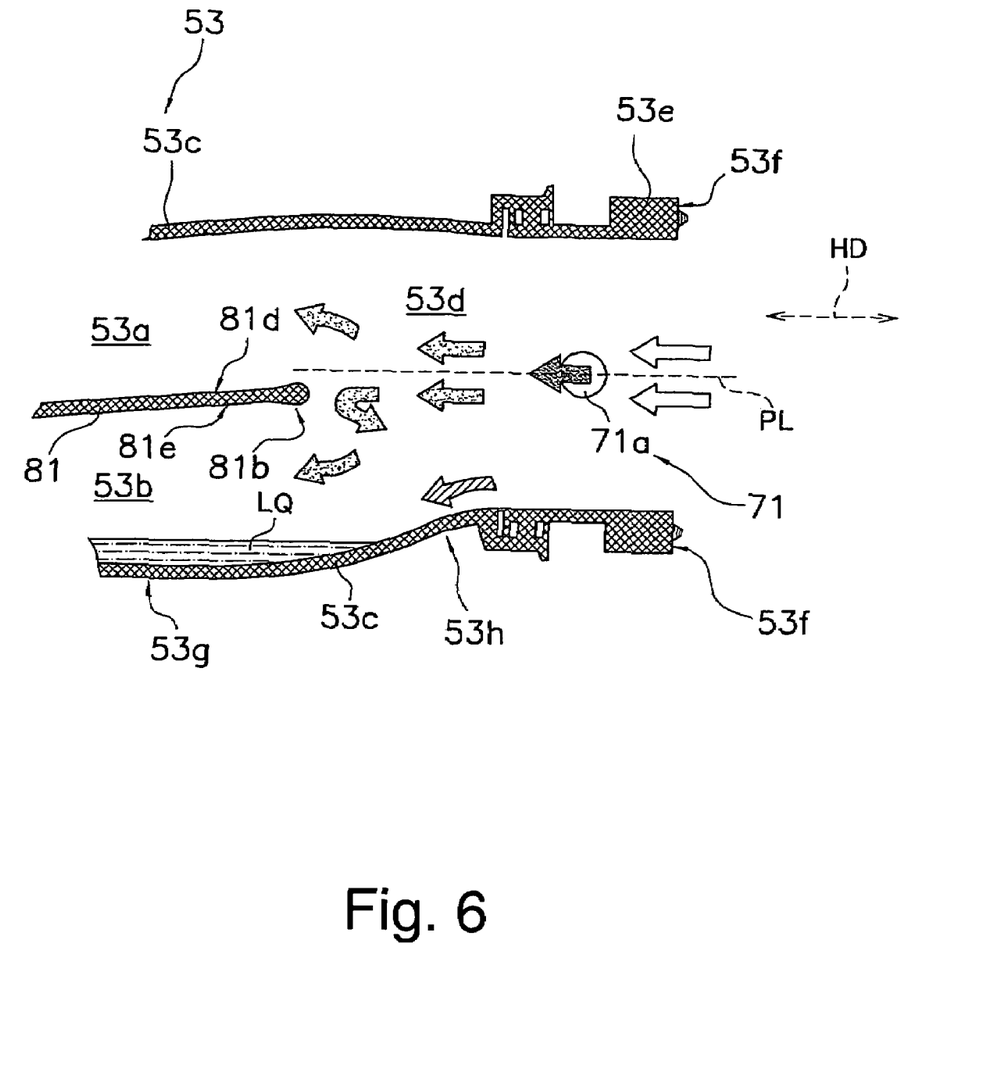
FIG. 6 is a partial cross sectional view of the internal combustion engine intake device in accordance with the present invention as seen along a section line VI-VI of FIG. 2.

As shown in FIGS. 1, 4, 5 and 6, the intake device 70 basically includes an intake passage 50, a throttle or regulating valve 91 (see FIG. 1), the intake valves 21 (see FIG. 1), a partitioning part 80, and a gas introducing pipe 71 (see FIG. 6). The intake passage 50 is the passage through which fresh air flows until it is drawn into the combustion chamber 63. The intake passage 50 basically includes a throttle or regulating chamber 54 (see FIG. 1), an air induction pipe 53, an intake air collector 51, the intake branches 52, and the intake ports 23 (see FIG. 1). The partitioning part 80 comprises a first partitioning plate 81 and a second partitioning plate 82.

The throttle valve 91 is arranged in the throttle chamber 54. The throttle valve 91 is configured and arranged such that the amount of fresh air flowing through the throttle chamber 54 can be changed by changing the opening degree of the throttle valve 91. As a result, the throttle valve 91 is configured and arranged to adjust the quantity of fresh air taken into the combustion chambers 63.

The air induction pipe 53 is provided between the throttle chamber 54 and the intake air collector 51. As shown in FIG. 2, the air induction pipe 53 has a pipe wall 53c that is curved in a substantially circular arc-like shape and serves as a communication passage between the throttle chamber 54 and the intake air collector 51. As shown in FIGS. 5 and 6, the space inside the air induction pipe 53 is divided by the first partitioning plate 81 into a first air induction space 53a and a second air induction space 53b such that the first air induction space 53a is disposed above the first partitioning plate 81 and the second air induction space 53b is disposed below the first partitioning plate 81 with respect to the vertical direction of the vehicle. The first air induction space 53a is fluidly communicated with the right-hand cylinder bank and the second air induction space 53b is fluidly communicated with the left-hand cylinder bank. The first partitioning plate 81 is configured and arranged to extend from a position in a vicinity of the throttle valve 91 (i.e., a position near a flange 53e but slightly downstream from the flange 53e) to a position where the intake air collector 51 begins. As seen in FIG. 6, the remaining space inside the air induction pipe 53 constitutes a third air induction space 53d positioned downstream of the throttle valve 91 and upstream of the first partitioning plate 81.

The gas introducing pipe 71 is connected in such a manner as to merge with the air induction pipe 53 at a position between the throttle chamber 54 and the first partitioning plate 81. The gas introducing pipe 71 is thus arranged such that it can introduce purge gas (first gas) into the third air induction space 53d. The purge gas mentioned here is gas from a canister (not shown) serving to prevent evaporated fuel in the fuel tank (not shown) from being discharged to the outside.

As shown in FIG. 4, the intake air collector 51 is enclosed by a collector wall 51c. The intake air collector 51 is arranged downstream of the throttle valve 91 and the air induction pipe 53. The intake air collector 51 has the form of a generally rectangular box with the air induction pipe 53 being connected thereto in the vicinity of a central portion thereof. The space inside the intake air collector 51 is divided by the second partitioning plate 82 into a first collector space and a second collector space such that the first collector space is disposed above the second partitioning plate 82 and the second collector space is disposed below the second partitioning plate 82 with respect to the vertical direction of the vehicle. The first collector space is fluidly communicated with the right-hand cylinder bank and the second collector space is fluidly communicated with the left-hand cylinder bank.

The second partitioning plate 82 has an end portion 82c that is located close to the air induction pipe 53 and is joined to an end portion 81c of the first partitioning plate 81 that is located close to the intake air collector 51 in a smooth and uninterrupted manner as shown in FIG. 4. Consequently, the first collector space communicates with the first air induction space 53a but does not communicate with the second air induction space 53b. Similarly, the second collector space communicates with the second air induction space 53b but does not communicate with the first air induction space 53a.

As seen in FIG. 4, the intake branches 52 are enclosed by branch walls. The intake branches 52 are arranged between the intake air collector 51 and the cylinder head 20. The intake branches 52 are connected to the opposite side of the intake air collector 51 as the air induction pipe 53. There is one intake branch 52 provided with respect to the intake ports 23 of each of the left and right cylinder banks (FIG. 2 shows an example in which there are six cylinders). More specifically, the intake branches 52 include a first intake branch having a first branch pipe 52a, a second branch pipe 52b, a third branch pipe 52c, and a second intake branch includes a fourth branch pipe 52d, a fifth branch pipe 52e, and a sixth branch pipe 52f. The first branch pipe 52a, the second branch pipe 52b, and the third branch pipe 52c of the first intake branch serve the right-hand cylinder bank and are configured to extend from the first collector space to the respective intake ports 23 of the right-hand bank of cylinders. The fourth branch pipe 52d, the fifth branch pipe 52e, and the sixth branch pipe 52f of the second intake branch serve the left-hand cylinder bank and are configured to extend from the second collector space to the respective intake ports 23 of the left-hand bank of cylinders. One of the intake valves 21 is provided at the downstream end of each intake port 23 and serves to open and close communication between the intake port and the respective combustion chamber 63.

Overview of Operation of Internal Combustion Engine Intake Device

The throttle valve 91 is opened to a prescribed opening degree based on a command from an ECU (not shown). The quantity of fresh air taken in is adjusted according to the opening degree of the throttle valve 91. The fresh air passes through the throttle chamber 54 and into the air induction pipe 53. Meanwhile, purge gas from the canister (not shown) is directed into the gas introducing pipe 71. The purge gas flows through the gas introducing pipe 71 and into the third air induction space 53d. The purge gas mixes with the fresh air in the third air induction space 53d and forms a first air mixture. The first air mixture is divided into a portion that flows through the first air induction space 53a toward the intake air collector 51 and a portion that flows through the second air induction space 53b toward the intake air collector 51. Consequently, the pulsations of the fresh air in the first air induction space 53a can be offset so as to be out of phase with the pulsations of the fresh air in the second air induction space 53b, thereby enabling resonance to be utilized with respect to the intake of air.

The first air mixture introduced into the first collector space from the first air induction space 53a is directed to the intake ports 23 of the right-hand bank of cylinders via the first branch pipe 52a, the second branch pipe 52b, and the third branch pipe 52c. The first air mixture introduced into the intake ports 23 is directed into the combustion chambers 63 and combusted when the intake valves 21 open.

Likewise, the second air mixture introduced into the second collector space from the second air induction space 53b is directed to the intake ports 23 of the left-hand bank of cylinders via the fourth branch pipe 52d, the fifth branch pipe 52e, and the sixth branch pipe 52f. The second air mixture introduced into the intake ports 23 is directed into the combustion chambers 63 and combusted when the intake valves 21 open.

Description of First Partitioning Plate Relative to Throttle Valve

As seen in FIG. 1, the throttle valve 91 is pivotally mounted on a rotary shaft 91a that forms the rotational axis of the throttle valve 91. A projection of the rotary shaft (rotational axis) 91a (see FIG. 1) of the throttle valve 91 onto a plane that is coplanar with respect to the mating surface 53f of the flange 53e (which mates with the throttle chamber 54) is indicated in FIG. 5 as a broken line. An upstream portion 81b of the first partitioning plate 81 is slanted at an angle θ (e.g., 12°) with respect to the rotary shaft 91a of the throttle valve 91. More specifically, the first partitioning plate 81 has a first surface 81d that faces toward the first air induction space 53a and a second surface 81e that faces toward the second air induction space 53b. The first and second surfaces 81d and 81e are substantially parallel to each other and the portions thereof corresponding to the upstream portion 81b are oriented at the angle θ with respect to the rotary shaft 91a of the throttle valve 91.

The horizontal direction HD is a horizontal direction corresponding to the mounted state of the intake device 70 with respect to the vehicle. The horizontal direction HD is substantially parallel to the rotary shaft 91a (see FIG. 1) of the throttle valve 91. Thus, the first partitioning plate 81 is also slanted at an angle θ (e.g., 12°) with respect to the mounted-state horizontal direction HD. More specifically, the substantially parallel portions of the first and second surfaces 81d and 81e that correspond to the upstream portion 81b are oriented at the angle θ with respect to the mounted-state horizontal direction HD. Consequently, the cross sectional coefficients of the air induction pipe 53 and the first partitioning plate 81 with respect to an axis that passes through the center axis CA and is parallel to the horizontal direction HD (i.e., with respect to an axis that is coincident with the rotary shaft 91a and shown as a broken line in FIG. 5) is improved in comparison with a case in which the first partitioning plate 81 is not slanted with respect to the horizontal direction HD. As a result, the occurrence of up-and-down vibrations that are substantially perpendicular to the horizontal direction HD can suppressed in comparison with a case in which the first partitioning plate 81 is not slanted with respect to the horizontal direction HD.

The first partitioning plate 81 extends along the direction in which the air induction pipe 53 extends. More specifically, the angle that the first surface 81d and second surface 81e of the first partitioning plate 81 make with the rotary shaft 91a of the throttle valve 91 (see FIG. 1) gradually decreases toward 0 from the angle θ as one moves from the upstream portion 81b to the downstream portion 81c. At the downstream portion 81c, the first surface 81d and the second surface 81e of the first partitioning plate 81 join with the end portion 82c of the second partitioning plate 82 located close to the air induction pipe 53 and make an angle of approximately 0 with respect to the rotary shaft 91a. The second partitioning plate 82 is also substantially parallel to the rotary shaft 91a. In this way, the first and second surfaces 81d and 81e form smooth, continuous surfaces with the corresponding surfaces of the second partitioning plate 82 that is horizontally arranged and thus parallel to the rotary shaft 91a of the throttle valve 91. As a result, the first partitioning plate 81 and the air induction pipe 53 can be fabricated using vibration welding at a welding surface WS1 (indicated with single-dot chain line in FIG. 3) and a welding surface WS2 (indicated with double-dot chain line in FIG. 3). Vibration welding is a less expensive fabrication method than the GDC method used for aluminum casting or the lost core method used for plastic molding.

Meanwhile, the air induction pipe 53 is made such that when the intake device is installed in a vehicle, a downstream portion 53g is lower than an upstream portion 53h. More specifically, the air induction pipe 53 is configured such that a lower portion of the pipe wall 53c extends diagonally downward from the vicinity of the flange 53e to the vicinity of the upstream portion 81b of the first partitioning plate 81. Meanwhile, an upper portion of the pipe wall 53c maintains substantially the same height along the portion spanning from the vicinity of the flange 53e to the vicinity of the upstream portion 81b of the first partitioning plate 81.

As shown in FIG. 4, an inlet opening 71a is provided in the pipe wall 53c of the air induction pipe 53 at a position disposed between the flange 53e and the upstream portion 81b of the first partitioning plate 81. This opening 71a enables the gas introducing pipe 71 to introduce purge gas into the third air induction space 53d.

Description of Air Induction Pipe

Referring now to FIGS. 5 and 6, the air induction pipe 53 will now be discussed in more detail. FIG. 5 is an end view of the intake device 70 as seen along the direction of the arrows V in FIG. 2. FIG. 6 is cross sectional view of the intake device 70 taken along the section line VI-VI of FIG. 2.

The quantity of fresh air taken in is adjusted by the throttle valve 91. The fresh air passes through the throttle chamber 54 and into the third air induction space 53d of the air induction pipe 53, as indicated by the white (unshaded) arrows in FIG. 6. The extension line PL indicated as a broken line in FIG. 6 is an extension of a projection line drawn from the rotary shaft 91a (see FIG. 1) of the throttle valve 91 to a plane that is coplanar with respect to the mating surface 53f of the flange 53e (which mates with the throttle chamber 54). In other words, since the fresh air passing through the throttle chamber 54 proceeds along a position that is offset from the rotary shaft 91a, the fresh air directed into the third air induction space 53d also proceeds along a position offset from the extension line PL of the projection line.

Meanwhile, purge gas from the canister (not shown) is directed into the gas introducing pipe 71. The purge gas directed into the gas introducing pipe 71 is introduced into the third air induction space 53d through the opening 71a at a position between the throttle valve 90 and the first partitioning plate 81.

The fresh air directed into the third air induction space 53d and the purge gas introduced into the third air induction space 53d mix together in a space spanning from the vicinity of the opening 71a to the upstream portion 81b of the first partitioning plate 81, thereby forming a first air mixture. The portion of the first air mixture flowing under the projection line extension line PL tends to collide with and rebound from the upstream portion 81b of the first partitioning plate 81. Consequently, turbulence develops in the third air induction space 53d. The turbulence promotes the mixing of the purge gas and fresh air, thereby causing the concentration of purge gas in the first air mixture to be substantially uniform by the time the first air mixture reaches the vicinity of the upstream portion 81b of the partitioning plate 81.

The first air mixture with substantially uniform concentration is divided into a portion that flows through the first air induction space 53a toward the intake air collector 51 and a portion that flows through the second air induction space 53b toward the intake air collector 51. The portion of the first air mixture in the first air induction space 53a flows along the first surface 81d as it flows toward the first collector space. Since the first surface 81d is smooth and continuous, the resistance to air flow in the first air induction space 53a is small. Similarly, the portion of the first air mixture in the second air induction space 53b flows along the second surface 81e as it flows toward the first collector space. Since the second surface 81e is smooth and continuous, the resistance to air flow in the second air induction space 53b is small.

There are times when water vapor and/or oil vapor is introduced into the third air induction space 53d along with the fresh air or the purge gas. In such a case, the water vapor or oil vapor tends to condense in the third air induction space 53d, collect in the bottom of the air induction pipe 53, and back-flow into throttle chamber 54 from the third air induction space 53d. However, the air induction pipe 53 is configured such that the downstream portion 53g is lower than the upstream portion 53h. Consequently, the condensed water/oil LQ flows along the bottom of the air induction pipe 53 from the upstream portion 53h toward the downstream portion 53g, as indicated by the arrow shaded with diagonal hatching in FIG. 6. Thus, the condensed water/oil LQ collects in a portion of the bottom of the air induction pipe 53 that is distant from the throttle valve 91. As result, the degree to which condensed water and oil LQ flow back into the throttle valve 91 is reduced.

In the embodiment, the first partitioning plate 81 of the partitioning part 80 is configured and arranged such that the upstream portion 81b is slanted with respect to the rotary shaft 91a of the throttle valve 91. Meanwhile, the gas introducing pipe 71 is configured and arranged to introduce purge gas into the third air induction space 53b of the air induction pipe 53 at a position between the throttle valve 91 and the first partitioning plate 81 of the partitioning part 80. As a result, mixing of the purge gas and the fresh air is promoted.

Since mixing of the purge gas and fresh air is promoted in this fashion, the first air mixture delivered from the first air induction space 53a to the cylinders of the right cylinder bank via the first collector space and the first air mixture delivered to from the second air induction space 53b to the cylinders of the left cylinder bank via the second collector space are each substantially homogeneous. As a result, the purge gas is distributed more uniformly to the cylinders.

In the embodiment, the first partitioning plate 81 of the partitioning part 80 is configured and arranged such that the upstream portion 81b is slanted with respect to the mounted-state horizontal direction HD. As a result, the cross sectional coefficients of the air induction pipe 53 and the first partitioning plate 81 are higher and vertically oriented vibrations are suppressed.

In the embodiment, the first partitioning plate 81 of the partitioning part 80 extends along the direction in which the air induction pipe 53 extends. Thus, since the first surface 81d and second surface 81e of the first partitioning plate 81 are configured as smooth, continuous surfaces, the first partitioning plate 81 of the partitioning part 80 and the air induction pipe 53 can be fabricated inexpensively using vibration welding. Also, the air flow resistance of the first air induction space 53a and the second air induction space 53b can be held low.

In the embodiment, the air induction pipe 53 has a portion 53g that is lower than an upstream portion 53h. As a result, condensed water and oil accumulated in the bottom of the air induction pipe 53 near the downstream side of the throttle valve 91 is less likely to flow backward toward the throttle valve 91 and, thus, the condensed water and oil can be prevented from adhering to the throttle valve 91.

It is acceptable for the angle θ at which the upstream portion 81b of the first partitioning plate 81 is slanted with respect to the rotary shaft 91a of the throttle valve 91 to be any other angle from 7° to 19° instead of 12°. So long as the angle θ is in the aforementioned range, the first air mixture flowing below the projection line extension line PL can be made to collide with and rebound from the upstream portion 81b of the first partitioning plate 81 and, at the same time, the air flow resistance can be suppressed in the first air induction space 53a and the second air induction space 53b.

It is also acceptable for the gas introduced into the third air induction space 53d from the gas introducing pipe 71 to be blow-by gas, EGR gas, or another gas instead of purge gas. Even when a different gas is introduced, the first partitioning plate 81 of the partitioning part 80 is configured and arranged such that the upstream portion 81b is slanted with respect to the rotary shaft 91a of the throttle valve 91 so that mixing of the fresh air and the blow-by gas, EGR gas, or the like can be promoted.

It is further acceptable for the internal combustion engine 1 to be a flat engine instead of a V-type engine. Also, the number of cylinders of the internal combustion engine 1 is not limited to six. The invention can be applied to engines having four, eight, ten, twelve, or another number of cylinders.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine intake device comprising:
    a regulating chamber having a regulating valve configured and arranged to rotate about a rotational axis to regulate a quantity of fresh air flowing therethrough;
    an intake air collector fluidly communicating with the regulating chamber at a position downstream of the regulating valve;
    an air induction pipe arranged between the regulating valve and the intake air collector to fluidly communicate the regulating chamber with the intake air collector, the air induction pipe including a partitioning part arranged and configured to divide a space inside the air induction pipe into a first air induction space and a second air induction space, the partitioning part having an upstream end portion that is slanted with respect the rotational axis of the regulating valve; and
    a gas introducing pipe configured and arranged to introduce a first gas into a space inside the air induction pipe at a position disposed between the regulating valve and the partitioning part.

2. The internal combustion engine intake device as recited in claim 1, wherein
    the gas introducing pipe is configured and arranged as one of a purge gas pipe that introduces purge gas as the first gas, a blow-by gas pipe that introduces blow-by gas as the first gas, or an EGR gas pipe that introduces EGR gas as the first gas.

3. The internal combustion engine intake device as recited in claim 1, wherein
    the upstream end portion of the partitioning part is slanted with respect to a horizontal direction of a vehicle when the internal combustion engine intake device is mounted in the vehicle.

4. The internal combustion engine intake device as recited in claim 1, wherein
    the partitioning part extends along a direction in which the air induction pipe extends.

5. The internal combustion engine intake device as recited in claim 1, wherein
    the air induction pipe includes an upstream wall portion located upstream of the partitioning part, and an intermediate upstream wall portion located downstream of the upstream wall portion and near the partitioning part, the intermediate upstream wall portion being arranged lower than the upstream wall portion with respect to a horizontal direction of a vehicle when the internal combustion engine intake device is mounted in the vehicle.

6. The internal combustion engine intake device as recited in claim 2, wherein
the upstream end portion of the partitioning part is slanted with respect to a horizontal direction of a vehicle when the internal combustion engine intake device is mounted in the vehicle.

7. The internal combustion engine intake device as recited in claim 2, wherein
the partitioning part extends along a direction in which the air induction pipe extends.

8. The internal combustion engine intake device as recited in claim 2, wherein
the air induction pipe includes an upstream wall portion located upstream of the partitioning part, and an intermediate upstream wall portion located downstream of the upstream wall portion and near the partitioning part, the intermediate upstream wall portion being arranged lower than the upstream wall portion with respect to a horizontal direction of a vehicle when the internal combustion engine intake device is mounted in the vehicle.

9. The internal combustion engine intake device as recited in claim 3, wherein
the partitioning part extends along a direction in which the air induction pipe extends.

10. The internal combustion engine intake device as recited in claim 3, wherein
the air induction pipe includes an upstream wall portion located upstream of the partitioning part, and an intermediate upstream wall portion located downstream of the upstream wall portion and near the partitioning part, the intermediate upstream wall portion being arranged lower than the upstream wall portion with respect to a horizontal direction of a vehicle when the internal combustion engine intake device is mounted in the vehicle.

11. The internal combustion engine intake device as recited in claim 4, wherein
the air induction pipe includes an upstream wall portion located upstream of the partitioning part, and an intermediate upstream wall portion located downstream of the upstream wall portion and near the partitioning part, the intermediate upstream wall portion being arranged lower than the upstream wall portion with respect to a horizontal direction of a vehicle when the internal combustion engine intake device is mounted in the vehicle.

12. The internal combustion engine intake device as recited in claim 1, wherein
the intake air collector is divided into a first collector space fluidly communicating with the first air induction space and isolated from the second air induction space, and a second collector space fluidly communicating with the second air induction space and isolated from the first air induction space.

13. The internal combustion engine intake device as recited in claim 12, wherein
the second air induction space is located below the first air induction space with respect to a vertical direction of the vehicle, and
the second collector space is located below the first collector space with respect to a vertical direction of the vehicle.

14. The internal combustion engine intake device as recited in claim 13, wherein
the partitioning part has a downstream end portion located adjacent the intake air collector with the downstream end portion of the partitioning part being substantially parallel with respect the rotational axis of the regulating valve.

15. The internal combustion engine intake device as recited in claim 13, wherein
the partitioning part has a downstream end portion located adjacent the intake air collector with the downstream end portion of the partitioning part being substantially parallel with respect a horizontal direction of a vehicle when the internal combustion engine intake device is mounted in the vehicle.

16. The internal combustion engine intake device as recited in claim 1, wherein
the partitioning part has a downstream end portion located adjacent the intake air collector with the downstream end portion of the partitioning part being substantially parallel with respect the rotational axis of the regulating valve.

17. The internal combustion engine intake device as recited in claim 1, wherein
the partitioning part has a downstream end portion located adjacent the intake air collector with the downstream end portion of the partitioning part being substantially parallel with respect a horizontal direction of a vehicle when the internal combustion engine intake device is mounted in the vehicle.

18. An internal combustion engine intake device comprising:
regulating means for regulating a quantity of fresh air flowing therethrough with the regulating means having a regulating valve configured and arranged to rotate about a rotational axis;
intake air collecting means for collecting intake air into a first collector space and a second collector space;
air induction means for introducing intake air from to an upstream side of the intake air collecting means;
partitioning means for dividing the intake air in the air induction means into first air and second air induction spaces that fluidly communicate with the first and second collector spaces; and
gas introducing means for introducing a first gas into a space inside the air induction means at a position disposed between the regulating means and the partitioning means.

* * * * *